United States Patent [19]

Colanzi et al.

[11] 4,437,536

[45] Mar. 20, 1984

[54] SUPPORT ASSEMBLY FOR VEHICLE WHEELS

[75] Inventors: Franco Colanzi; Vittorio Donn, both of Turin, Italy

[73] Assignee: RIV-SKF Officine, Turin, Italy

[21] Appl. No.: 372,962

[22] Filed: Apr. 29, 1982

[30] Foreign Application Priority Data

May 18, 1981 [IT] Italy .................. 67655 A/81

[51] Int. Cl.³ ................. B60B 37/00; B60K 17/22
[52] U.S. Cl. .................. 180/254; 180/258; 180/73; 301/126; 308/190; 308/236
[58] Field of Search .......... 180/73 R, 73 C, 73 D, 180/88, 254, 259, 258; 301/126, 132; 308/236, 190

[56] References Cited

U.S. PATENT DOCUMENTS

| | | | |
|---|---|---|---|
| 696,777 | 4/1902 | Ward | 308/236 |
| 1,812,784 | 6/1931 | Hawley | 308/236 |
| 2,037,982 | 4/1936 | Hughes | 301/126 |
| 4,046,433 | 9/1977 | Kiener | 301/126 |

FOREIGN PATENT DOCUMENTS 2848169  5/1979  Fed. Rep. of Germany ...... 180/254

*Primary Examiner*—John A. Pekar
*Attorney, Agent, or Firm*—Shlesinger, Arkwright, Garvey & Fado

[57] ABSTRACT

A support assembly for a motor vehicle wheel having an outer ring provided with a flange for fixing to a suspension strut for the wheel, an inner ring with a fixing flange for the wheel, and rolling elements which roll between the two rings, in which the inner ring is mounted on a shaft and is provided with oppositely directed conical surfaces cooperating with a conical surface formed on a shoulder of the shaft coaxially with respect to a cylindrical surface formed on the shaft itself and with a conical surface of a ring fitted over the cylindrical surface.

15 Claims, 3 Drawing Figures

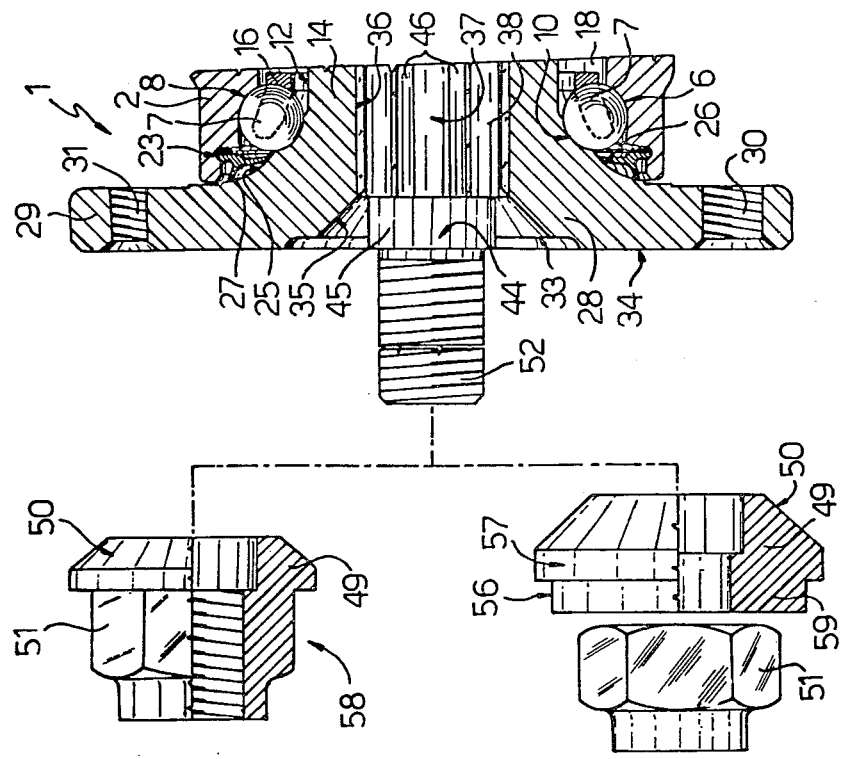
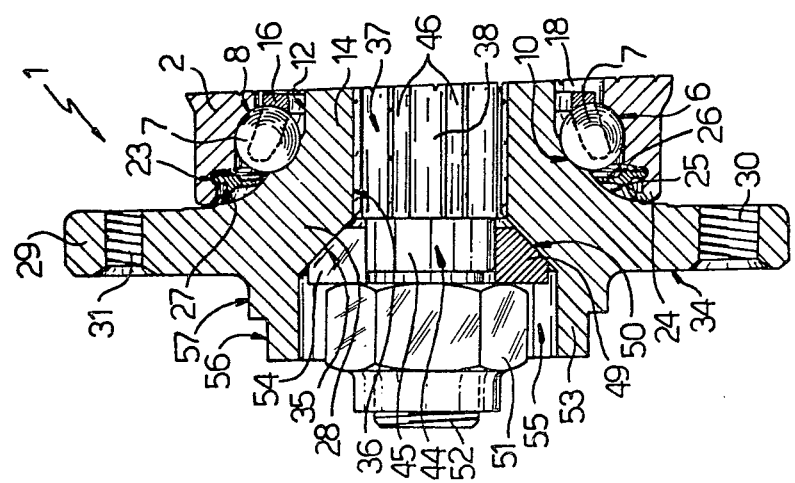

SUPPORT ASSEMBLY FOR VEHICLE WHEELS

BACKGROUND OF THE INVENTION

The present invention relates to a support assembly for the road wheels of a vehicle, and particularly to a support assembly for the driving wheels of a motor vehicle.

It is known that modern support assemblies for the driving wheels of motor vehicles have a very compact structure with integrated rolling bearings which are able simultaneously to perform multiple functions, such as that of wheel hub, bearing, shaft and spindle. The said bearings, usually of the mixed type having two inclined rings of balls, in fact comprise an inner, substantially cylindrical ring, provided at one end with a flange for fixing to a wheel of the motor vehicle and having an inner surface on which is formed a splined coupling, and an outer, substantially cylindrical ring, provided at an end opposite to the said end of the inner ring, with a flange for fixing to a suspension strut for the said wheel. Between the said rings the rolling elements are interposed, which roll in suitable tracks and are protected by known sealing assemblies, the inner ring is further keyed by means of the splined coupling to a shaft of a ball joint thus allowing the transmission of the driving couple to the wheel. A variant of the described bearing is also known, in which the inner ring is composed of two coaxial annular elements which are fitted together, a first of which carries the said splined coupling and a rolling track for a ring of rolling elements and has a sleeve end on which is mounted a second element carrying a second rolling track for a second ring of rolling elements.

The constructional arrangements described have certain disadvantages. In particular the arrangement with the inner ring formed as a single element is limited in the number of rolling elements which can be introduced, and therefore involves the necessity of making the bearings over size in order to avoid overloading them. The arrangement with an inner ring formed by two connected elements allows this disadvantage to be partly overcome in that it permits a higher number of rolling elements to be introduced thus achieving an optimum filling of the bearings. The transmission of the drive couple by means of a splined coupling, however, makes it necessary to adopt a high minimum thickness of the sleeve end on which the second element is mounted in order to avoid weakening of a strongly stressed zone. Since the maximum overall external dimensions of the bearing are fixed by the available space, which is the same for any type of bearing, this involves the necessity of using rolling elements (in this case balls) of a reduced diameter in order to remain within the overall dimensional limits. As is known, however, rolling elements of reduced dimensions have a reduced load bearing capacity and this largely nullifies the advantage deriving from filling the bearing well. Moreover, a perfect centring of the two component elements of the inner ring is necessary and this is expensive and requires difficult working of the coupling surfaces.

SUMMARY OF THE INVENTION

The object of the present invention is that of providing a support assembly for the road wheels of motor vehicles which will be free from the above mentioned disadvantages.

According to the present invention there is provided a support assembly for a motor vehicle wheel and particularly for a driving wheel of a road vehicle, comprising at least one inner ring provided with a fixing flange for the said wheel, an outer ring provided with a flange for fixing to a suspension strut for the said wheel, and a pair of rings of rolling elements interposed between the said rings and able to roll in tracks on the said rings, the said inner ring being mounted rigidly on a shaft provided with a shoulder for axially fixing the said inner ring, characterised by the fact that the said inner ring has at respective opposite ends first and second oppositely directed coaxial conical surfaces, the said first conical surface being engageable with a third conical surface formed on the said shoulder coaxially with a cylindrical surface coaxial to the said shaft, and formed on this latter at one end of the said shaft, a centring ring mounted coaxially surrounding the said cylindrical surface being provided with a fourth conical surface engageable with the said second conical surface, axial thrust means for the said centring ring being rigidly mounted on the said shaft.

BRIEF DESCRIPTION OF THE DRAWINGS

For a better understanding of the present invention there is now given, by way of non limitative example, a description of a preferred embodiment thereof, with reference to the attached drawings, in which:

FIGS. 2 and 3 illustrate possible variants of the support assembly of FIG. 1.

DETAILED DESCRIPTION OF THE INVENTION

Figure 1:
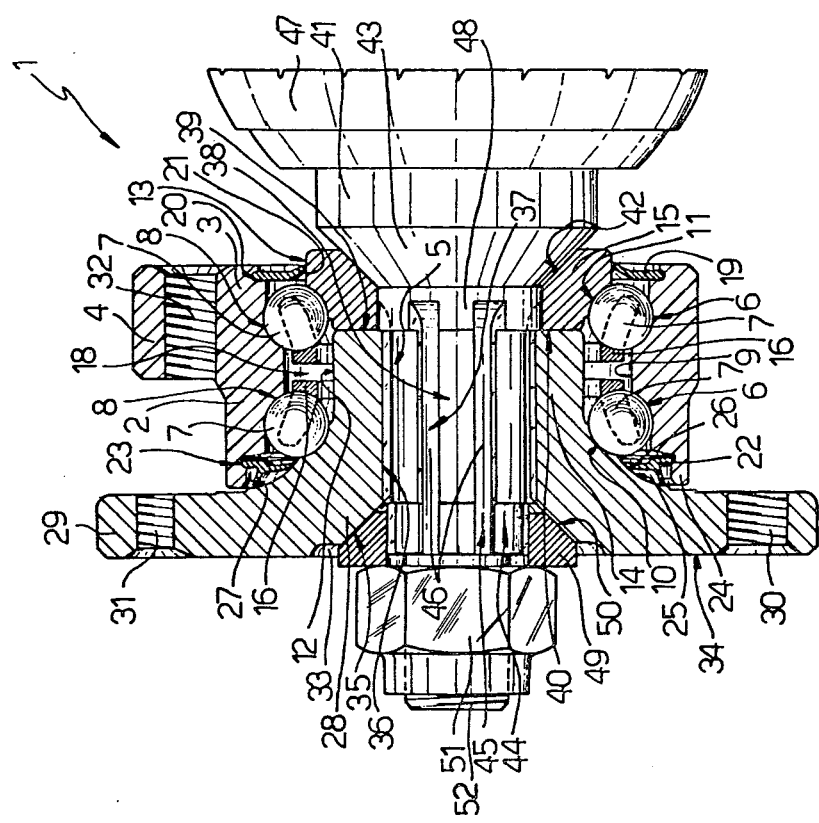
FIG. 1 illustrates a longitudinal section of a support assembly for vehicle wheels formed according to the principles of the present invention.

With reference to FIG. 1 there is generally indicated, with the reference numeral 1 a support assembly for a driving wheel (not illustrated) of a motor vehicle, including an outer ring 2 provided at one end 3 with a flange 4 for fixing to a strut (not illustrated) of a suspension for the said wheel, an inner ring 5 and two rings 6 of rolling elements 7 rolling between a pair of annular tracks 8 formed on an inner surface 9 of the outer ring 2, and a pair of annular tracks 10 and 11 formed respectively on outer surfaces 12 and 13 of a first annular element 14 and a second annular element 15, which are coaxial to one another and constitute components of the inner ring 5.

The rolling elements 7, which can be balls as illustrated or cylindrical rollers, are held together by spacer cages 16 and are isolated, with their respective rolling tracks, from the environment outside a cavity 18 lying between the rings 2 and 5 and in which the rolling elements 7 are housed, by means of known sliding lip seal assemblies. A first sealing assembly, constituted by a sealing screen 19 fitted into a seat 20 formed on the surface 9 at the end 3, forms a sliding seal on the surface 13 of the element 15 by means of a lip 21, whilst a second sealing assembly 21 of the double sliding lip type, fitted into a seat 23 of the ring 2 formed on an end 24 of this latter opposite the end 3, effects both an axial and a radial sliding seal on a curved section 25 of the surface 12 by means of a radial lip 26 and an axial lip 27.

The annular element 14 has, at its end 28 opposite the end 3 of the ring 2 and on which is formed the curved section 25 of the surface 12, a flange 29 for fixing to the wheel of a vehicle, which flange is provided with threaded holes 30 for fixing screws (not illustrated) and a threaded hole 31 for a reference pin (again not illustrated). Likewise, the flange 4 also has threaded holes 32 for fixing screws (not illustrated).

The ring 14 has a shallow recess 33 formed on a front surface 34 of the flange 29, within which is a worked conical surface 35 coaxial with the annular track 10 and with the axis of the element 14 itself.

The conical surface 35 tapers towards the end 3, that is to say its diameter decreases as it approaches the said end 3. The annular element 14 also has an inner surface 36 engageable with a splined coupling 37 formed on a shaft 38 on which the annular elements 14 and 15 constituting the inner ring 5 are mounted. The annular element 14 also has a front surface 39 opposite the surface 34 and perpendicular to the axis of the element 14 itself. The surface 39 is ground and abuts against a correspondingly worked surface 40 belonging to the element 15, which lies between the element 14 and a shoulder 41 constituted by a diametral enlargement of the shaft 38. The annular element 15 which is mounted at the end 3 also has a worked conical surface 42 facing a shoulder 41 and tapering in a direction opposite that of the surface 35. The surface 42 is coaxial with the track 11 and with the element 15 itself and is engageable with a corresponding worked conical surface 43 formed in a facing position on the shoulder 41.

The surface 43 is coaxial with a ground cylindrical surface 44 formed on an end 45 of the shaft 38 opposite the shoulder 41.

In FIG. 1 the surface 44 is discontinuous in that it is constituted by the crests of teeth 46 of the splined coupling 37 formed on the outer surface of the shaft 38 which is integrally formed with a known ball joint 47 which receives driving couple from a half-shaft, not illustrated, and transmits it through the coupling 37 to the element 14 and from this to the wheel of the vehicle. The surface 44 can however also be continuous, in which case the splined coupling 37 is interrupted before the end 45. The ring 14 is therefore connected for rotation with the shaft 38 on which it is mounted, thanks to the splined coupling 37, whilst the ring 15 is rigidly connected to the shaft 38, possibly with play, at a terminal section 48 of the coupling 37. In the case of mounting with play it obviously does not transmit any couple.

On the surface 44 of the shaft 38 there is mounted, a centring ring 49 coaxial with the surface 44 itself and therefore with the shaft 38 and inserted into the element 14. The ring 49 is provided with a worked conical surface 50 formed in a position facing the surface 35 and having a cone shape corresponding to this latter. The surface 50 is therefore coaxial with the surface 44 and engageable with the surface 35. The ring 49 is pressed against the element 14 by means of a nut 51 which is screwed on a threaded end section 52 of the end 45 of the shaft 38 and the element 14, in turn, presses the element 15 against the shoulder 41.

In FIGS. 2 and 3 there are illustrated variants of the support assembly 1 which are almost entirely the same as the embodiment of FIG. 1 and in which therefore similar or identical elements are indicated with the same reference numerals. In particular the assembly of FIG. 2 differs from that of FIG. 1 by the presence of a centring sleeve 53 integral with the flange 29, and by the fact that the ring 49 has a radial slit 54. The sleeve 53 is formed perpendicularly to the surface 34 concentrically with respect to the shallow recess surface 54 in which the conical surface 35 is formed, and houses the nut 51 in a recess 55. It is provided with external surfaces 56 and 57 which allow the centring of the wheel and of the brake on the assembly 1, thereby facilitating the assembly operations. The slot 34 on the other hand confers a degree of elasticity on the ring 49 which can thus deform radially under the pressure of the nut 51 thereby also serving as a washer for the nut 51 as well as a centring function for the element 14. Finally, the centring surface 44 is in this case continuous in that the splined coupling 37 is interrupted before the end 45.

In FIG. 3 there are illustrated two other possible variants of the assembly 1 which are illustrated with the ring 49 separated from it. In a first variant similar to the embodiment of FIG. 1, the ring 49 and the associated thrust nut 51 are integrally formed in a single thrust element 58, whilst in the second variant, similar to that of FIG. 2, the centring surfaces 56 and 57 are formed directly on an end 59 of the ring 49 which projects from the surface 54 after assembly.

In use the support assembly 1 is interposed between a wheel and the half-shaft of a vehicle by fixing the flange 29 to the wheel, the flange 4 to the wheel suspension strut, and the joint 47 to the half-shaft. This transmits a couple to the shaft 38 through the joint 47 and, thanks to the splined coupling 37, the drive is therefore transmitted to the annular element 14 and from this to the wheel. Upon assembly the two annular elements 14 and 15 are automatically centred by the conical surfaces 43 and 50 which cooperate with the conical surfaces 42 and 35 respectively, and which are formed on the elements 15 and 14, under the action of the thrust imparted by the ring 49 which is perfectly centred on the shaft 38 thanks to the cylindrical surface 44 on which it is firmly fitted. The nut 51 and the conical surfaces 43 and 50 also allow the radial play between the rolling bodies (balls or rollers) and the tracks 8, 10 and 11, which forms by wear after a long period of use, to be compensated by resilient deformation of the rings 15 and 14.

From what has been described the advantages of the support assembly of the present invention will be apparent. In particular it allows a support assembly to be obtained in which it is possible to sub-divide the inner ring into two completely independent annular elements each of which carries a track for the rolling bodies. In this way it is possible to arrange these latter in such a way as to obtain an optimum filling of the space available between the inner and outer rings, and to employ rolling elements of larger diameter and therefore with a high load bearing capacity. In fact, the transmission of movement involves only one of the annular elements whilst the second is centred with respect to the first by external means (conical surfaces) rather than with rebates or sleeves formed on the first element and therefore subjected to limitations in the minimum admissible thickness. Moreover, a very precise centring of the tracks formed on the two annular elements is obtained using limited surfaces and a simple working, thus obtaining lower production costs. In particular, the conical and cylindrical surfaces of the shaft of which the annular elements are mounted can be obtained with a single working using a shaped grinding wheel, thus ensuring a perfectly coaxial arrangement of these two reference surfaces. This coaxial positioning is then transmitted to the elements of the inner ring thanks to the conical surface couplings which, moreover, allow compensation of any possible small radial play by acting on the thrust nut. Finally, the splined surfaces of the shaft and the inner surfaces of the elements of the inner ring can be worked without requiring high precision since they do not affect the centring.

From what has been described it will, moreover, be clear that variations and modifications can be introduced to the support assembly of the present invention without departing from the scope of the invention itself. In particular, in the case of non driven wheels, the splined coupling 37 can be dispensed with and the shaft 38 need not be connected to the joint 47 but serves only as a support for the two elements 14 and 15 of the inner ring 5. Moreover the conical centring surfaces can have a different orientation from that illustrated.

We claim:

1. A support assembly (1) for a wheel of a vehicle, particularly for a driving wheel of a road vehicle, comprising at least one inner ring (5) provided with a flange (29) for fixing to the said wheel, an outer ring (2) provided with a fixing flange (4) for fixing to a wheel suspension strut, and a pair of rings (6) of rolling elements (7) interposed between said rings (2,5) and able to roll on tracks (8,10,11) on said rings (2,5), said inner ring (5) being rigidly mounted on a shaft (38) provided with a shoulder (41) for axially fixing said inner ring (5), wherein said inner ring (5) has at its opposite ends a first (42) and a second (35) conical surface respectively, these surfaces being coaxial and directed in opposite directions, said first conical surface (42) being engageable with a complementary third conical surface (43) formed on said shoulder (41) coaxially with respect to a cylindrical surface (44) coaxial to said shaft (38) including at one end (45) of the said shaft (38), a centering ring (49) mounted coaxially with respect to said cylindrical surface (44) and being provided with a complementary fourth conical surface (50) engageable with said second conical surface (35), axial thrust means (51) for pressing against and holding said centering ring (49) in position on said shaft (38).

2. A support assembly (1) according to claim 1, wherein said inner ring (5) includes a first (15) and a second (14) annular element, these elements being coaxial and mounted in sequence on said shaft (38) between said shoulder (41) and said centering ring (49), said first conical surface (42) being formed on said first element (15) in a position facing said shoulder (41) to which said first element (15) is adjacent, said second conical surface (35) being formed on an end (28) of said second element (14) opposite said shoulder (41) and adjacent said centering ring (49); a first (11) of said tracks (8,10,11) being formed on an outer surface (13) of said first element (15) and a second (10) of said tracks (10,11,8) being formed on an outer surface (12) of said second element (14) including said flange (29) for fixing to said wheel at said end (28).

3. A support assembly (1) according to claim 2, wherein said second annular element (14) is provided with an inner surface (36) torsionally connectible with said splined coupling (37) of said shaft (38).

4. A support assembly (1) according to claim 2, wherein said cylindrical surface (44) includes a splined engaging surface complementary with a splined surface of said second conical surface (35).

5. A support assembly (1) according to claim 1, wherein said shaft (38) is integrally formed with a ball joint (47) operable to transmit a couple from a half-shaft of said vehicle to said shaft (38).

6. A support assembly (1) according to claim 1, wherein said shaft (38) is provided with a splined coupling (37) formed on an outer surface thereof and operable to transmit drive from said shaft (38) to said inner ring (5).

7. A support assembly (1) according to claim 1, wherein said first (42) and second (35) conical surfaces are coaxial with a pair (10,11) of said tracks (8,10,11) formed on said inner ring (5).

8. A support assembly (1) according to claim 1, wherein said second conical surface (35) tapers inwardly towards said flange (4) for fixing said outer ring (2).

9. A support assembly (1) according to claim 1, wherein said thrust means include a nut (51) screwed on a threaded end section (52) of said shaft (38).

10. A support assembly (1) according to claim 9, wherein said nut (51) can exert a thrust on said centering ring (49) sufficient to deform said inner ring (5) in such a way as to compensate for small radial play between this and said outer ring (2).

11. A support assembly (1) according to claim 9, wherein said nut (51) and said centering ring (49) are integrally formed in a single thrust element (58).

12. A support assembly (1) according to claim 1, wherein said centering ring (49) has a radial slit (54) for permitting radial deformation thereof.

13. A support assembly (1) according to claim 1, wherein the assembly includes centering surfaces (56,57) for said wheel and for a brake of said wheel.

14. A support assembly (1) according to claim 13, wherein said centering surfaces (56,57) are formed on a sleeve (53) integral with said flange (29) of said inner ring (5), perpendicular to front surface (34) and concentric with a shallow recess (33) in which said second conical surface (35) is formed.

15. A support assembly (1) according to claim 13, wherein said centering surfaces (56,57) are formed on an end (59) of said centering ring (49) projecting, after assembly, from said flange (29) for said wheel.

* * * * *